(12) United States Patent
Taffin et al.

(10) Patent No.: US 6,547,697 B1
(45) Date of Patent: Apr. 15, 2003

(54) METHOD FOR CONTROLLING ENGINE TORQUE WHEN SHIFTING GEARS

(75) Inventors: Christian Taffin, Garches (FR); Jean-Pierre Arbona, Bures-Morainvilliers (FR)

(73) Assignees: Renault, Boulogne Billancourt (FR); Automobiles Peugeot, Paris (FR); Automobiles Citroen, Neuilly sur Seine (FR)

( * ) Notice: Subject to any disclaimer, the term of this patent is extended or adjusted under 35 U.S.C. 154(b) by 0 days.

(21) Appl. No.: 09/831,774

(22) PCT Filed: Nov. 12, 1999

(86) PCT No.: PCT/FR99/02779

§ 371 (c)(1), (2), (4) Date: May 14, 2001

(87) PCT Pub. No.: WO00/29244

PCT Pub. Date: May 25, 2000

(30) Foreign Application Priority Data

Nov. 12, 1998 (FR) .............................. 98 14220

(51) Int. Cl.⁷ .............................................. B60K 41/04
(52) U.S. Cl. ..................................................... 477/109
(58) Field of Search ........................................ 477/109

(56) References Cited

U.S. PATENT DOCUMENTS

| | | | | |
|---|---|---|---|---|
| 5,079,970 A | * | 1/1992 | Butts et al. | |
| 5,307,711 A | * | 5/1994 | Kimura et al. | |
| 5,613,920 A | * | 3/1997 | Uno et al. | 477/109 |
| 5,820,516 A | * | 10/1998 | Sasaki et al. | 477/109 |
| 6,254,508 B1 | * | 7/2001 | Kojima et al. | 477/109 |
| 6,269,293 B1 | * | 7/2001 | Correa et al. | 701/51 |

FOREIGN PATENT DOCUMENTS

| | | |
|---|---|---|
| DE | 37 35 246 A1 | 5/1988 |
| EP | 0 278 856 | 8/1988 |
| EP | 0 536 759 A3 | 4/1993 |
| EP | 0 536 759 A2 | 4/1993 |

* cited by examiner

*Primary Examiner*—Dirk Wright
(74) *Attorney, Agent, or Firm*—Young & Thompson

(57) ABSTRACT

The invention relates to a motor vehicle comprising a fully automatic transmission, of the type in which a management unit (20) controls the operation of the engine (10) as a function of torque demand information from a throttle pedal (24), and of the type in which the engine management can be modified as a function of information transmitted by a transmission (16) control unit (22) to the engine (10) management unit (20), characterized in that for certain phases of operation of the vehicle, the transmission (16) control unit (22) inhibits the action of the torque demand information, for which it substitutes an engine management command to which the management unit (20) is subordinated.

18 Claims, 4 Drawing Sheets

METHOD FOR CONTROLLING ENGINE TORQUE WHEN SHIFTING GEARS

BACKGROUND OF THE INVENTION

The invention relates to a motor vehicle comprising improved means for managing gear shifts in a fully automatic transmission.

The invention relates more particularly to a motor vehicle comprising a fully automatic transmission, of the type comprising a transmission control unit and an engine management unit, of the type in which the management unit receives, from a throttle pedal, information representative of the torque demand from the driver, on the basis of which information it is capable of controlling the operation of the engine, of the type in which the engine is capable of supplying information to the transmission control unit, and of the type in which the engine management can be modified as a function of information transmitted by the transmission control unit to the engine management unit.

In vehicles equipped with purely mechanical transmissions, in which the transmission, with stepped ratios, is connected to the engine via a friction clutch and in which the driver himself selects and engages the ratios via a gearshift lever, it is the driver who has to manage the gearshifting as best he can in order that these gearshifts occur entirely smoothly.

In order to do that, he controls, on the one hand, the engine speed, using the throttle pedal and, on the other hand, the progressive disengagement and engagement of the clutch, by his action on the clutch pedal.

Automatic transmissions have been in existence for many years now. This category includes, in particular, conventional automatic transmissions in which various planetary gear sets define predetermined stepped ratios, the ratios being selected by actuating various brakes or clutches which selectively immobilize certain components of the planetary gear set(s) so as to determine a gear ratio between the output shaft and the input shaft of the transmission.

Another type of automatic transmission consists of conventional mechanical transmissions with positive-engagement mechanisms, in which transmissions the ratios are selected and engaged not directly by the driver by means of a lever, but now using actuators managed by a control unit. It is possible for these actuators to operate only at the express behest of the driver, in which case the latter retains full control over the timing of the gearshift, or, on the other hand, it is possible for gearshifting to take place automatically, under the control of the control unit, as to a function of parameters similar to those used for determining the gearshift moments in a conventional automatic transmission.

A transmission such as this will be known in the following part of the text as a semiautomatic transmission.

Incidentally, it will be seen that certain aspects of the invention can equally be applied to transmissions with no stepped ratios, such as belt-driven continuously variable transmissions.

Particularly in the case of fully automatic transmissions, it has become apparent that very good control over the gearshift phase is of overriding importance for good vehicle drivability and passenger comfort. Such drivability and comfort can be obtained only by completely eliminating any lack of smoothness likely to occur during gearshifts. Now, particularly in conventional automatic transmissions and in semiautomatic transmissions it is necessary, during gearshifts, to couple and uncouple friction members by means of which the motive power of the engine is transmitted to the wheels of the vehicle. The disengagement and engagement of these friction couplings assume transient phases which are difficult to control perfectly because these are phases in which two elements are slipping one with respect to the other.

These problems are exacerbated particularly when it is not the driver who decides the timing of the gearshift because, in such an instance, he generally keeps the throttle pedal depressed which means that the gearshift may occur while the engine is delivering a relatively high torque.

In order to overcome this drawback, it is already known practice to contrive for the engine to be managed during the gearshift in such a way that it supplies just part of the torque demanded by the driver, for example by reducing this demand by a fixed percentage.

This solution does not, however, make it possible to obtain results which are entirely satisfactory in all cases, particularly where, during the gearshift, the torque demand expressed by the driver varies wildly.

It is therefore an object of the present invention to provide a new motor vehicle architecture in which, to culminate in the smoothest possible gearshifts, the requirements associated with the transmission can take precedence over those imposed by the

SUMMARY OF THE INVENTION

To this end, the invention proposes a motor vehicle of the type described previously, characterized in that, for certain phases of operation of the vehicle, the transmission control unit inhibits the action of the torque demand information, for which it substitutes an engine management command to which the management unit is subordinated.

According to other features of the invention:
when shifting from an old gear ratio to a new gear ratio which is lower, the transmission control unit transmits to the engine management unit, a management command whereby the engine is managed to cause it to follow a given speed variation curve;
the transmission ratios are determined by whether friction couplings are disengaged or engaged, the transmission is connected to the engine by a hydraulic torque converter, and when shifting from an old gear ratio to a new gear ratio which is lower, the transmission control unit transmits to the engine management unit a management command whereby the engine is managed such that an input shaft of the transmission follows a given speed variation curve;
the transmission ratios are determined by whether friction couplings are disengaged or engaged, the transmission is connected to the engine by a hydraulic torque converter, when shifting from an old gear ratio to a new gear ratio which is higher, the transmission control unit transmits to the engine management unit, during a step in which it is detected that the new ratio has bitten, a management command whereby the engine is managed so that it provides a bite detection torque;
bite is detected when the onset of the drop in the rotational speed of an input shaft of the transmission is measured;
the bite detection torque is a constant torque;
when shifting from an old gear ratio to a new gear ratio which is higher, the transmission control unit transmits to the engine management unit, during an engine speed decrease step, a management command whereby the engine is managed so that it supplies an engine speed decrease torque;

the engine speed decrease torque is determined by the control unit so that the duration of the engine speed decrease step is more or less equal to a predetermined duration;

the engine speed decrease step begins when the biting of the new ratio is detected;

the value of the engine speed decrease torque is a value that is constant during the engine speed decrease step;

the value of the engine speed decrease torque is a value which changes during the engine speed decrease step as a function of the torque demanded by the driver;

the value of the engine speed decrease torque is a value which depends on the level of torque demanded by the driver;

the transmission control unit receives the torque demand information supplied by the throttle pedal, the torque demand information is compared by the control unit with a maximum torque value, and when the torque demand remains higher than the maximum torque value for a predetermined duration, the transmission control unit transmits to the engine management unit, a management command whereby the engine is managed so that it supplies a torque equal to the maximum torque value;

the transmission control unit receives the torque demand information supplied by the throttle pedal, the torque demand information is compared by the control unit with a maximum torque value, and when the torque demand becomes higher than the maximum torque value, the transmission control unit transmits to the engine management unit, a management command whereby the engine is managed so that it supplies a torque equal to the maximum torque value, except in the event of a sudden increase in the demand for torque;

in the event of a sudden increase in the demand for torque, during which the torque demand becomes higher than the maximum torque value, the transmission control unit transmits to the engine management unit a management command whereby the engine is managed so as to provide a torque which is higher than the maximum torque value, and if, after a predetermined duration, the torque demand remains higher than the maximum torque value, the transmission control unit transmits to the engine management unit a new management command whereby the engine is managed so that it supplies a torque equal to the maximum torque value;

the maximum torque value corresponds to a maximum permissible torque that can be transmitted through part of the vehicle driveline;

the transmission is connected to the engine by a hydraulic torque converter of the lockup type, and when the converter locks up, the transmission control unit sends to the engine management unit a management command whereby it cannot deliver a torque higher than a maximum lockup torque;

the ratios of the transmission are determined by whether friction couplings are disengaged or engaged, and when a ratio is engaged, the transmission control unit sends to the engine management unit a management command whereby it cannot deliver a torque that is higher than a maximum engagement

BRIEF DESCRIPTION OF THE DRAWINGS

Other features and advantages of the invention will become apparent upon reading the detailed description which follows, for an understanding of which reference will be made to the appended drawings, in which:

FIG. 5 is a flow diagram showing the procedure in the process for determining the torque set point with which the engine is supplied in a vehicle according to the invention.

DETAILED DESCRIPTION OF THE PREFERRED EMBODIMENTS

Figure 1:
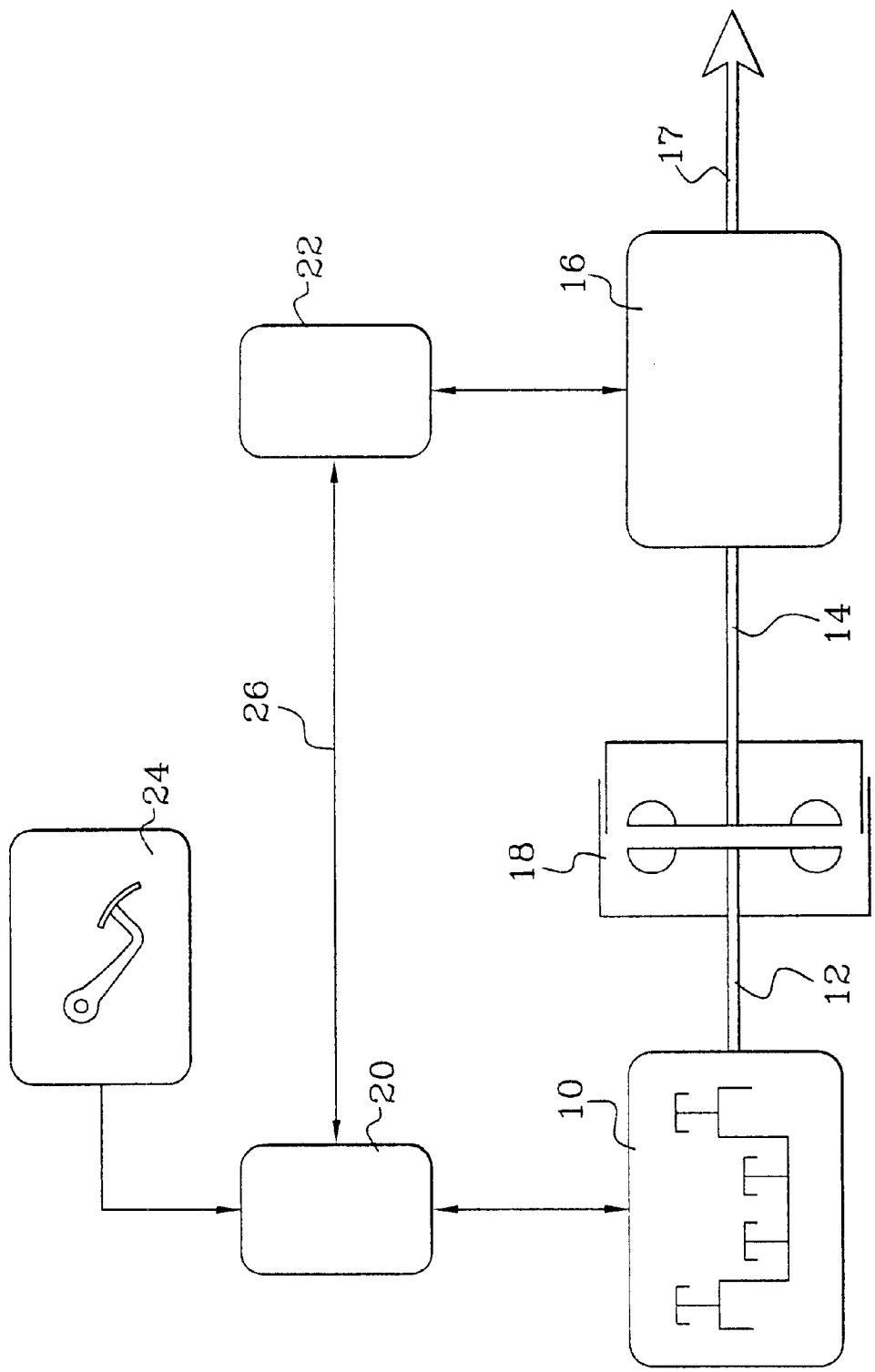
FIG. 1 is a schematic diagram illustrating various components of the driveline of a motor vehicle and the units for managing and controlling the engine and the transmission respectively.

FIG. 1 illustrates part of the driveline of a motor vehicle. This driveline comprises, in particular, an engine 10, the output shaft 12 of which drives the rotation of an input shaft 14 of a transmission 16, via a connecting member 18. The output shaft 17 of the transmission can drive the rotation of the driven wheels (not depicted) of the vehicle, possibly via various driveline components (not depicted) such as a differential.

The engine 10 may be a combustion engine, an electric motor, a hybrid engine, a turbine, etc.

The transmission 16 is a fully automatic transmission. In general, this is a transmission with stepped ratios such as a conventional planetary transmission or a semiautomatic transmission.

However, certain aspects of the invention could be applied to the case of a continuously variable transmission such as a belt-and-pulley transmission.

When the transmission 16 is a conventional automatic transmission, the connecting member 18 is usually a hydraulic torque converter.

When the transmission 16 is a semiautomatic transmission, the connecting member 18 is generally a friction clutch.

As has been depicted in FIG. 1, the engine 10 is managed by a management unit 20 and the transmission 16 comprises a control unit 22. In the conventional way, the driver of the vehicle has an interface member, such as a throttle pedal 24, on which he acts to control the engine 10 to cause the latter to supply a certain torque with a view to causing the vehicle to accelerate or to decelerate, or with a view to keeping the vehicle at a relatively constant speed.

As a preference, to implement the invention, the torque demand information supplied by the throttle pedal 24 will be information of the electrical type rather than information of a purely mechanical type. For that, the throttle pedal 24 is coupled to a position detector (not depicted) which, as a function of the angular position of the pedal, sends the engine 10 control unit 20 an electric torque demand signal. As a function of this torque demand from the driver, the management unit 20 acts on the engine 10 so that the latter supplies a torque which as closely as possible corresponds to this torque demand. For simplification purposes, the remainder of the text will consider that the engine 10 exactly follows the set point given to it and that it delivers the expected torque.

In particular, if the engine 10 is a combustion engine, the management unit 20 can act on the amount of air admitted to the engine, via a motorized butterfly-type inlet valve, on the amount of fuel injected, via an injection device, and on the fuel injection timing.

Of course, in addition to the torque demand information it receives from the throttle pedal 24, the engine management unit 20 may receive other information, such as the engine speed Nm, the water and/or oil temperatures, the external temperature, etc. from the other components of the vehicle. Likewise, the transmission control unit 22 receives information relating, in particular, to the rotational speed Ne of the input shaft 14 of the transmission 16, the speed V of the vehicle, or alternatively a binary signal of the activation of the vehicle braking signal, from the various members of the vehicle.

However, in accordance with the teachings of the invention, the engine 10 management unit 20 and the transmission 16 control unit 22 are connected to one another by communication means 26 by means of which the two units can exchange information. In particular, the engine management unit 20 may transmit to the transmission control unit 22 information relating to the actual torque supplied by the engine and to the torque demanded by the driver.

In the opposite direction, in accordance with the invention, the transmission 16 control unit 22 may, in particular, transmit to the engine 10 management unit 20, an engine management command such as, for example, a torque set point, which management command can be imposed on the engine 10 management unit 20.

Figure 2:
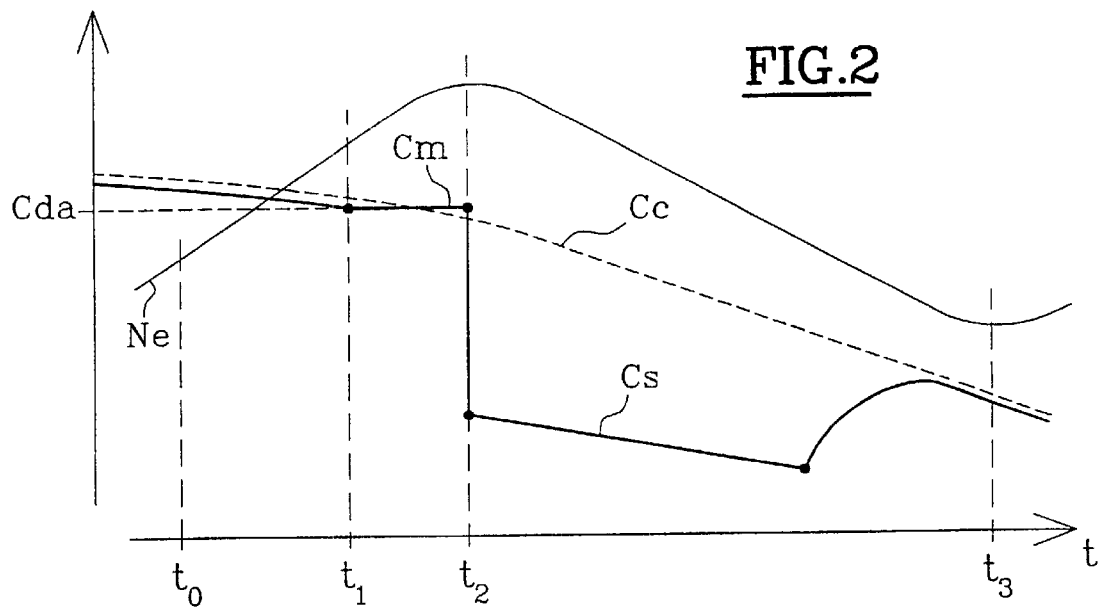
FIG. 2 is a diagram which illustrates, as a function of time, the torque demanded by the driver, the torque supplied by the engine and the rotational speed of the engine during an upshift from a lower ratio to a higher ratio in a motor vehicle according to the teachings of the invention.

FIG. 2 illustrates a diagram illustrating the torque demanded by the driver Cc, the engine torque Cm and the rotational speed Ne of the input shaft 14 of the transmission 16 as function of time during a gearshift by the transmission 16, more particularly during an upshift, that is to say, for example, when shifting from first gear to second gear, from second to third, etc.

To describe the various stages in this gearshift, we shall consider that case of an automatic transmission of conventional type with planetary gear sets. In this type of transmission, a gearshift takes place by disengaging a friction coupling member associated with the old gear ratio then by commanding the engagement of the friction coupling device corresponding to the new gear ratio.

Control of these coupling members is generally of the hydraulic type, but one of the major difficulties in performing a gearshift operation is that of determining the instant from which time onwards the coupling member(s) associated with the new gear ratio begins (begin) to "bite", that is to say begins (begin) to transmit useful torque.

One means of detecting this bite is to monitor the rotational speed Ne of the input shaft 14 of the transmission. What happens is that when the higher gear ratio begins to engage, the input shaft 14 of the transmission will see, on its transmission 16 end, a resistive torque which tends to brake it with respect to the driving torque supplied to it by the connecting member 18.

It can thus be seen that the rotational speed Ne of the input shaft 14 of the transmission is associated with the driving torque supplied to it by the engine 10 and with the resistive torque imposed on it by the output shaft 17 of the transmission 16, multiplied by the demultiplication coefficient of the gear ratio engaged.

The degree to which the new gear ratio bites is therefore associated with the percentage of resistance torque of the wheels actually applied to the input shaft 14.

A variation in the speed of the input shaft 14 will therefore be representative of a variation in this degree of bite.

However, for the variation in speed of the input shaft 14 to provide a reliable indication of the degree of bite, the driving torque supplied by the connecting member 18 to the shaft 14 must not vary significantly during the gearshift operation.

Now, in motor vehicles hitherto known, the driver at every moment maintains the possibility of modifying the torque demand he is imposing on the engine 10. Hence, if, during a gearshift, the driver significantly varies his torque demand, this will result in a significant variation in the driving torque supplied to the input shaft 14, which will disturb the detection of the bite of the new gear ratio and therefore lead to the torque not being transmitted smoothly in the gearshift.

Hence, according to the invention, the transmission 16 control unit 22 orders the engine 10 management unit 20 to manage the engine in such a way that it supplies, during a bite detection phase, a determined torque known as the biting torque Cda. This biting torque may be constant, as is illustrated in FIG. 2, or may be variable. In both instances it will advantageously be determined as a function of parameters such as the initial rotational speed of the engine or the driver's driving style.

As has been depicted in FIG. 2, the transmission 16 control unit 22 determines, at a moment t0, the need to shift gear from a lower gear to a higher gear. This determination is made in the conventional way as a function of parameters associated with the speed of the vehicle, with the torque demanded by the driver Cc and also as a function of the driver's driving style.

From this instant t0 on, the control unit 16 begins to initiate the gearshift process whereby it pre-disengages the friction coupling means associated with the old gear ratio then pre-engages those associated with the new gear ratio. However, shortly after the instant t0 of the decision to shift gear, the transmission 16 control unit 22 imposes, from the instant t1 onwards, on the management unit 20, the need to control the engine 10 in such a way that it supplies a constant bite detection torque Cda, it being possible for this torque to differ from the torque Cc demanded by the driver via the throttle pedal 24. During this bite detection step, the driver therefore no longer has any influence on the torque control of the engine.

Thus, by keeping the engine torque Cm constant during the bite detection step, this bite can be detected in an absolutely reliable way simply by analyzing the rotational speed Ne of the input shaft 14. Thus, as is illustrated in FIG. 2, at the instant t2 it can be seen that the rotational speed of the input shaft 14 stops increasing and begins to decrease. The derivative as a function of time of the rotational speed Ne therefore reaches zero at the instant t2 and then becomes negative. At the time that this derivative becomes zero, the control unit 22 can deduce from this that the new gear ratio has begun to bite.

However, at that instant t2, the complete disengagement of the friction coupling means associated with the old ratio is commanded and total engagement of those associated with the new gear ratio continues. The gearshift does not actually finish until the instant t4 when the rotational speed Ne of the input shaft 14 of the transmission 16 has reached a speed equal to the speed of the vehicle multiplied by the demultiplication factor of the driveline for the new gear ratio. To determine this rotational speed, for which there will no longer be any slip at the coupling means associated with the new ratio, the only knowledge required is that of the speed of travel of the vehicle.

According to a second aspect of the invention, after the phase of detecting that the new ratio has bitten, the transmission 16 control unit 22 continues to impose on the management unit 20, during a step in which the engine speed decreases, a management command whereby the engine has to deliver a torque that differs from the torque demanded by the driver Cc.

In the embodiment of FIG. 2, the control unit 22 thus determines, after the instant t2, an engine speed decrease torque Cs which follows a variation curve that differs from that of the torque demanded by the driver. This torque Cs is determined by the control unit 22 so that the duration of the engine speed decrease step is equal to an optimum duration as a function of a certain number of parameters. Thus, the torque Cs may be determined, in particular, as a function of the rotational speed of the input shaft at the time of bite and as a function of the driver's driving style, or even as a function of the torque demanded by the driver.

In effect, throughout the time lying between the instant t2 at the start of the bite of the new gear ratio, and the instant t4 of synchronism as defined above, slip occurs at the coupling means corresponding to the new gear ratio and this prevents all of the power supplied by the engine from being transmitted.

What happens is that the rotational speed of the output shaft 17 of the transmission 16 remains more or less constant throughout the gearshift but, because of the difference in demultiplication between the old and the new gear ratios, the speed Ne of the input shaft 16, which is close to that Nm of the engine 10, has to decrease from a high value to a lower value.

In the known way, the longer this decrease time, the more it might be thought that the ratio will bite "smoothly", with no jerkiness. However, throughout this engine speed decrease step, the driver can no longer influence the travel of the vehicle and, if its duration increases, this carries the risk of causing the driver some annoyance. Furthermore, that leads to a significant expenditure of energy at the friction coupling means which, ultimately, may lead to premature driveline wear.

Hence, as a function of parameters such as the speed of travel of the vehicle, the driver's driving style, the initial engine speed when the gearshift was begun at the instant t0, and also as a function of the ratios involved in the gearshift, or even as a function of the torque demanded by the driver, it may prove beneficial for this engine speed decrease step to vary in length. Hence, by fixing the engine speed decrease torque level Cs at a higher or lower value, the duration of the engine speed decrease step will be longer or shorter.

In the exemplary embodiment of FIG. 2, the variation in torque Cs is represented by a linear function that decreases as a function of time, but other types of variation may be adopted. It might be possible to choose a constant engine speed decrease torque Cs, the value of this constant depending, as appropriate, on the parameters seen earlier.

In any event, the engine speed decrease torque Cs is generally low so as to allow a relatively rapid drop in the speed of the input shaft 14.

So, throughout that part of the duration of the synchronization step that separates the instants t2 and t3 illustrated in FIG. 2, it is the transmission 16 control unit 22 which determines the torque that the engine 10 has to supply.

From the instant t3 onwards, the transmission 16 control unit 22 gives rise to a gradual variation in the engine control so as to bring the actual engine torque Cm close to the torque demand Cc expressed by the driver. As a preference, the two values are once again equal as soon as the synchronization instant t4 is reached.

It will be noted that the second aspect of the invention, namely the control unit 22 imposing an engine speed decreasing torque, is of great benefit both in the case of conventional automatic transmissions and in the case of semiautomatic transmissions.

Figure 3:
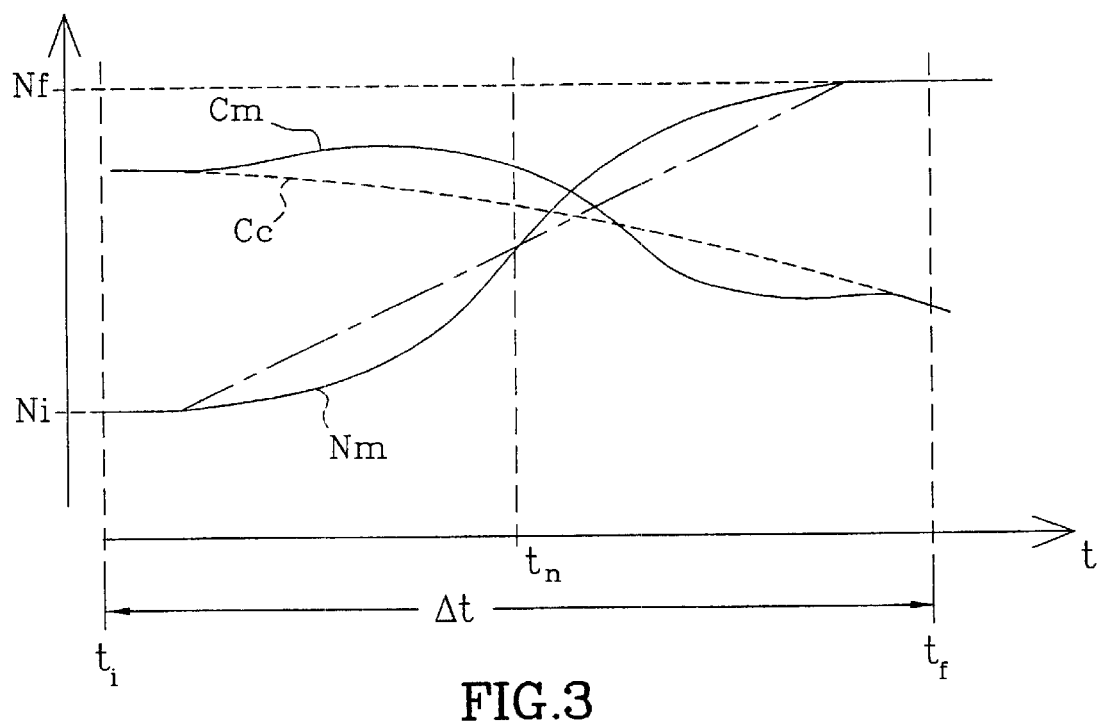
FIG. 3 is a diagram similar to that of FIG. 2 during a shift from a higher ratio to a lower ratio, that is to say during a downshift.

FIG. 3 illustrates a diagram illustrating, as a function of time, the engine torque Cm and the rotational speed of the engine Nm during a downshift, that is to say when shifting, for example, from second to first gear. It is known that in this type of gearshift, also known as downshifting, the shift is from an old gear ratio to a new gear ratio which is such that the engine speed and transmission input speed have to be higher at the end of the shift than they were at the beginning of the gearshift.

Now, during such a downshift, there is a phase during which the engine is uncoupled from the transmission. During this phase, the rotational speed of the engine will therefore be able to vary as a function of numerous parameters including, of course, the position of the throttle pedal but also including the power drawn by various items of equipment in the vehicle (the air conditioning, the alternator, etc.). As a result, the change in engine rotational speed may adopt values which differ widely from one downshift to another.

Now, if the rotational speed of the engine differs too greatly from the theoretical speed associated with the speed of travel of the vehicle and with the demultiplication ratio of the new gear ratio engaged, the end of the gearshift will inevitably not be smooth.

Hence, according to the teachings of the invention, when downshifting, the transmission 16 control unit 22 sends the management unit 20 a management command whereby the engine has to be managed so that it reaches a determined speed independently of the action of the driver on the throttle pedal 24.

FIG. 3 illustrates the speeds Ni, Nf of rotation of the engine at the instant ti initiating and at the instant tf finishing the gearshift, respectively, for two consecutive gear ratios, the vehicle more or less maintaining the same speed. The instants ti and tf are separated by a period of time ΔT which corresponds to an optimum time in which to make the shift. In that way, it is possible to plot a theoretical curve of the variation in rotational speed of the engine between the start and the end of the gearshift so that, at the end of the gearshift, the engine reaches the theoretical rotational speed Nf. In the example illustrated, this theoretical curve is represented by a simple straight-line segment.

FIG. 3 also illustrates the torque demand Cc expressed by the driver, the actual torque supplied by the engine Cm, and the curve of the variation in the actual rotational speed Nm of the engine 10.

According to the teachings of the invention, during downshifting, the engine is controlled not to cause it to supply a torque Cm equal to the torque demand Cc expressed by the driver, but to supply a torque Cm that allows the engine 10 to follow as closely as possible the engine speed theoretical variation curve. The engine 10 is then said to be speed controlled.

Hence, between the instants ti and tn, it can be seen that the rotational speed of the engine 10 is below the theoretical curve which means that the engine torque Cm is regulated in the increase direction, so as to increase the rotational speed of the engine. On the other hand, beyond the instant tn, the rotational speed of the engine becomes higher than this theoretical curve. Thus, the torque Cm is therefore regulated in the decreasing direction to slow the increase in the rotational speed Nm. The engine torque may be regulated as a function of the rotational speed of the engine Nm using a conventional regulator, for example of PID type, but this may also be achieved using a regulator that operates on fuzzy logic, or some other regulator.

In the context of a conventional automatic transmission, the input shaft 14 of the transmission 16 is driven continuously by the engine, even during the gearshift. Thus, in this case, it will be beneficial for the engine to be controlled not now in such a way as to control the rotational speed of the engine shaft 12, but directly so as to control the rotational speed Ne of the input shaft 14.

By virtue of this engine control method, the end of the gearshift will definitely see the engine rotational speed that is ideal for ensuring smoothness.

Figure 4:
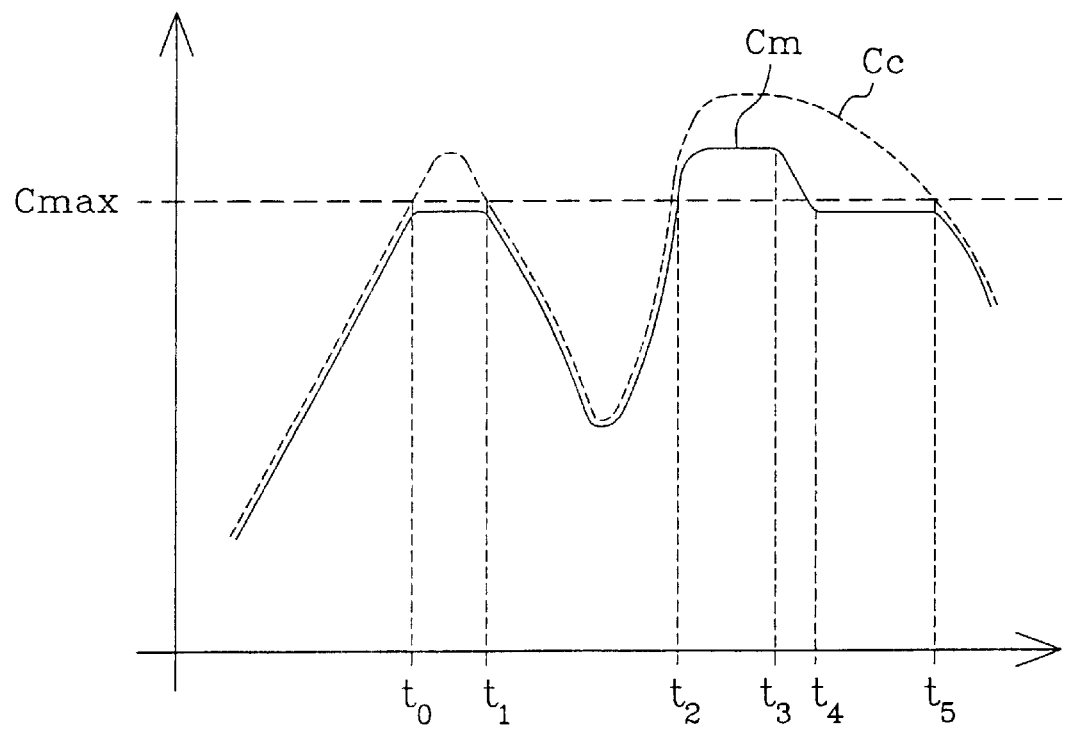
FIGS. 4 to 6 are diagrams illustrating the engine torque as a function of time in the case of a transmission whose control unit can limit the torque supplied by the engine as a function of parameters associated with the transmission.

FIG. 4 illustrates another feature of the invention which makes it possible to avoid imposing on a driveline a torque which is excessive and liable to damage it.

What happens is that sometimes, for economical reasons, an engine and a driveline (transmission, differential, etc.) which are not perfectly matched to one another are mounted on a vehicle, the engine being capable of delivering a power and a torque which exceed those that the driveline can withstand.

Hence, in the context of a vehicle in which the transmission 16 control unit 22 can impose on the engine 10 management unit 20 a command for managing the engine, it has become advantageous to be able to allow the control unit 22 to limit the torque supplied by the engine so as to prevent any damage to the driveline.

Thus, in the embodiment illustrated in FIG. 4, it can be seen that the engine 10 of the vehicle is capable of delivering a maximum torque which is higher than the torque CMAXt capable of being withstood by the driveline. Hence, according to a first aspect of the invention, provision is made for the transmission 16 control unit 22 to be able to prevent the engine 10 from delivering a torque Cm higher than the threshold value CMAXt.

In that way, as can be seen between the instants t0 and t1 in FIG. 4, even if the driver demands a torque higher than this threshold value, the control unit 22 will prevent the engine 10 from supplying a torque value higher than the threshold value.

However, according to one particular aspect of the invention, provision is made for the transmission 16 control unit 22 to allow the engine to supply a torque higher than the threshold value CMAXt, but for a limited length of time, and provided that that corresponds to a temporary demand from the driver.

It is thus possible to choose to authorize such an exceeding of the threshold value CMAXt only if the driver has displayed an urgent need for torque, for example by depressing the throttle pedal very quickly, as depicted in the second part of FIG. 4. The rate at which the pedal is depressed results, in the graph of FIG. 4, in a steeper or shallower slope of the curve illustrating the torque Cc demanded by the driver. This situation is typical of a passing maneuver.

In this case, it is possible to elect either to allow the engine 10 to deliver all of its power in accordance with the demand Cc of the driver over a certain period of time or, as has been illustrated in FIG. 4, to cap this excess torque supplied by the engine at a second threshold value higher than the value CMAXt. In any case, provision will be made for this additional torque not to be able to be delivered by the engine except for a certain period of time, for example illustrated by the period of time t2, t3 (in FIG. 4). Beyond the instant t3, even if the driver continues to exhort a torque higher than the threshold value CMAXt, the torque value Cm supplied by the engine is regulated to return progressively between the instants t3 and t4, to the threshold value CMAXt.

Thereafter, after the instant t5 when the torque demand made by the driver drops back below the threshold value, the engine torque is kept at the threshold value CMAXt. Beyond the instant t5, the engine torque Cm supplied is once again equal to the torque Cc demanded by the driver.

This arrangement of the invention thus makes it possible to mechanically preserve the entire driveline even if the engine is overrated, while at the same time allowing the driver, under certain circumstances, to enjoy additional torque and power, for example to make a passing maneuver.

It will be noted that this function of limiting the torque has three distinct aspects. In a first aspect, the engine torque is limited as a function of the robustness of the driveline. In a second aspect, this limit is removed under certain specific conditions in which additional torque is authorized. In a third aspect, the duration for which this additional torque is authorized is limited.

According to the invention embodiment which has just been described, these three aspects are combined. However, it is possible to elect to combine just two of these aspects.

Thus, for example, one may elect to envision for the additional torque to be authorized independently of the rate at which the pedal is depressed but for the duration of this additional torque to be limited. Likewise, one might envision not implementing the limitation on the duration of the additional torque but allowing this additional torque only under certain particular conditions.

In any case, the authorization for the additional torque may, for example, be subordinated to the fact that the vehicle is to in a given speed range. Likewise, the value of the additional torque and the duration of this additional torque will advantageously be determined as a function of parameters such as the driver's driving style, the transmission oil temperature, age of the driveline, the gradient of the road or the rate at which the throttle is depressed, etc.

It will be noted that this ability for the transmission 16 control unit 22 to limit the engine torque can be implemented for any type of transmission.

Furthermore, according to another aspect of the invention, the transmission 16 control unit 22 can be made to limit the engine torque likely to be supplied by the engine 10.

Thus, it is known that most vehicles that have a conventional automatic transmission also have a hydraulic torque converter inserted between the engine 10 and the transmission 16. This converter 18 is subject to power losses because of the slip that occurs under load between its input and output wheels. To avoid these losses, a lockup device is sometimes provided and mechanically connects the two wheels of the converter to prevent any slip. This lockup device is generally implemented when the higher gear ratios are engaged. According to the invention, it may be advantageous to limit the torque supplied by the engine 10 during the lockup operation. In this case, provision will therefore be made for the transmission 16 control unit 22 to send to the engine management unit a management command whereby it cannot deliver a torque higher than a maximum lockup torque.

Likewise, it may be advantageous to limit the torque supplied by the engine when engaging a gear ratio when the transmission is in neutral, that is to say in the position for which it transmits no torque between its input and its output. In this case, when the ratio is being engaged, the transmission 16 control unit 22 sends the engine management unit a management command whereby it cannot deliver a torque higher than a maximum engagement torque Ce.

Figure 6:
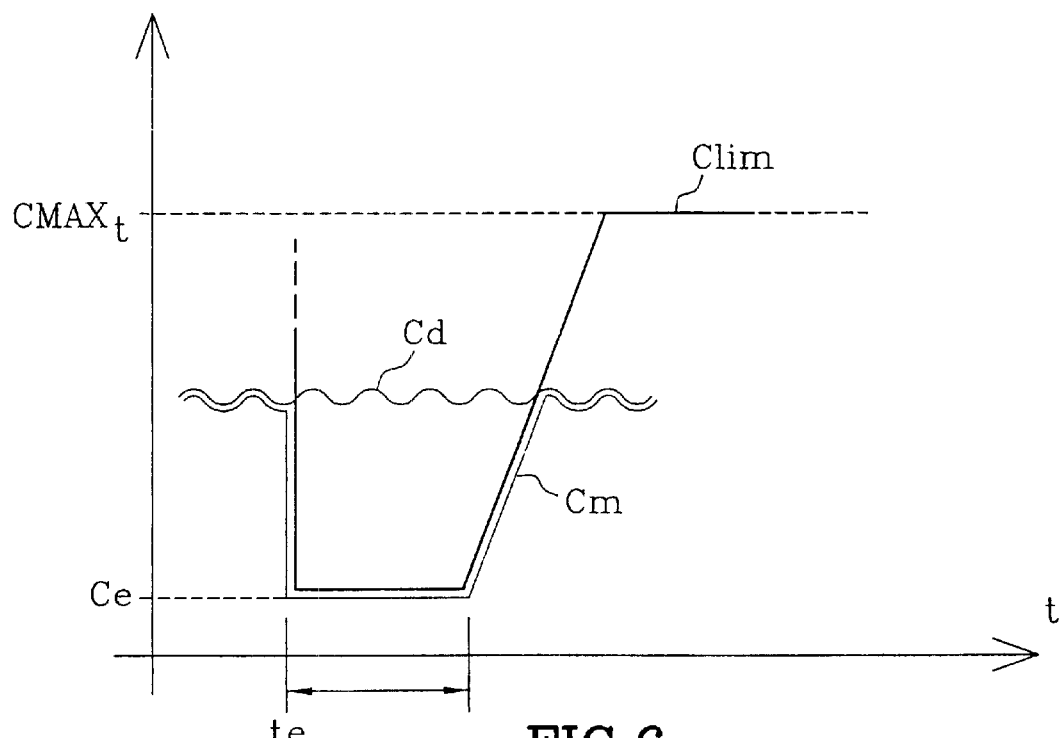

FIG. 6 thus illustrates the scenario of the engaging of first gear which begins at the instant te. The curve Cd represents the driver's demand for torque while the curve Clim illustrates the maximum limit on torque imposed on the engine 10 by the transmission 16 management unit 22. The torque actually delivered by the engine 10 is illustrated by the curve Cm.

It can be seen that, at the instant te, the limited torque imposed on the engine is equal to a value Ce corresponding to a torque that must not be exceeded during engagement. The value of this torque may, for example, vary as a function of which gear ratio is in the process of being engaged. This limit is maintained by the transmission 16 management unit 22 for a predetermined duration dt beyond which the value of Clim increases with a linear slope to reach, for example, the value CMAXt seen earlier. Thus, when the time period dt after the instant te elapses, which period may possibly vary as a function of the gear ratio being engaged, the value of the torque Cm delivered by the engine follows the slope of Clim until it reaches the level of the demand for torque Cd made by the driver. This embodiment of the invention makes it possible to avoid damage to the driveline when engaging a gear ratio under high torque.

Figure 5:
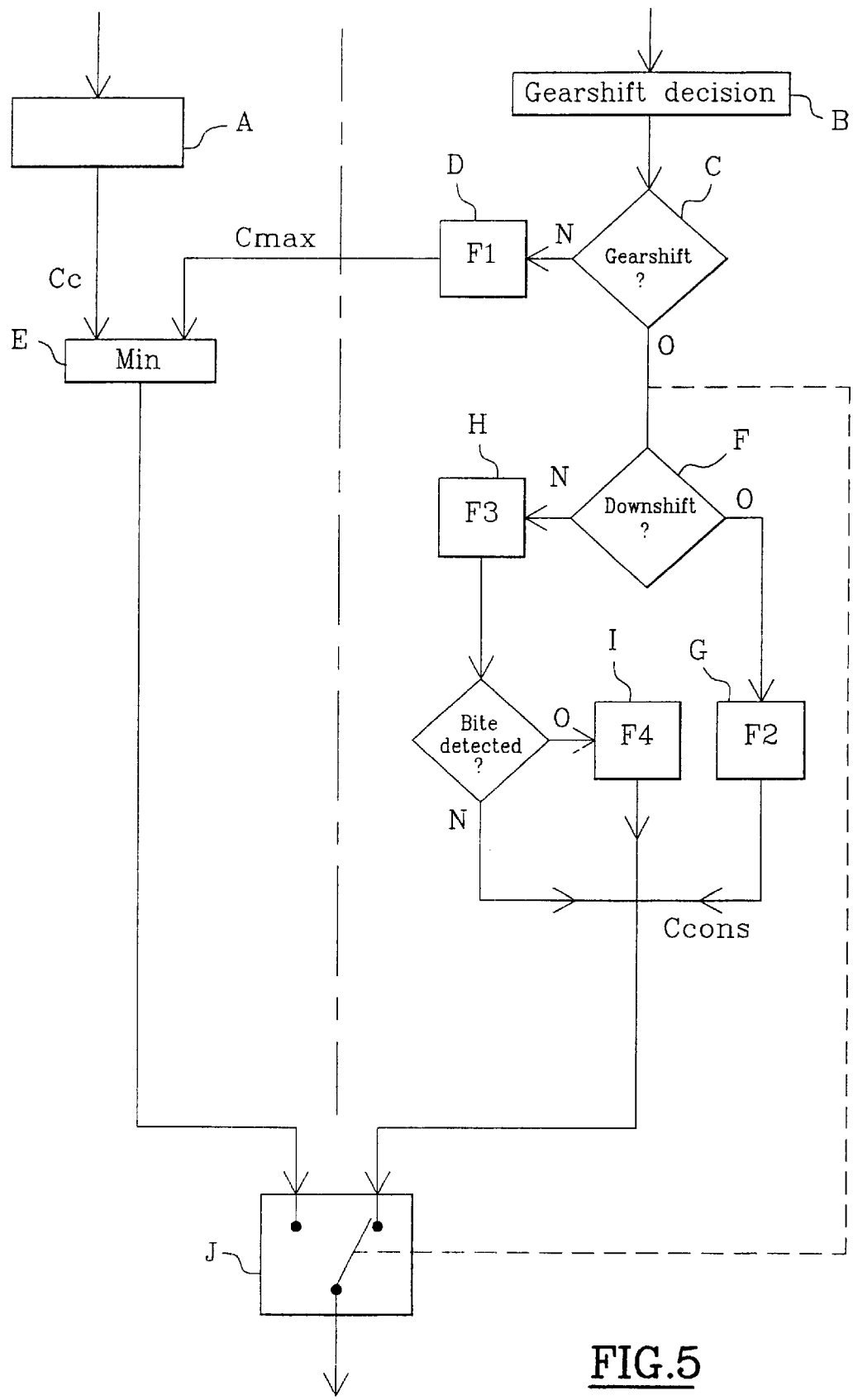

FIG. 5 illustrates a flow diagram that illustrates, in a simplified manner, various steps that allow the various aspects of the invention which have just been described to be implemented. The flow diagram of FIG. 5 is split into two parts, the left-hand part depicting the operations performed by the engine 10 management unit 20 and the right-hand part depicting the operations performed by the transmission 16 control unit 22. This flow diagram applies to cases in which the transmission 16 is a conventional automatic transmission.

In step A, the management unit 20 determines the torque demand Cc expressed by the driver, particularly as a function of the signal received from the throttle pedal 24 and as a function of the rotational speed of the engine Nm, and also as a function of torque set points which may be sent by various vehicle electronic control devices such as an antilock system, a traction control system, etc., and which may influence the demanded torque value.

In parallel, in steps B and C, the transmission 16 control unit 22 determines, in a way which is known from elsewhere, whether there is any need to make a gearshift.

If there is not, the transmission 16 control unit 22 proceeds, in step D, with the processing operation F1 whereby it limits the torque delivered by the engine in accordance with what was described with reference to FIG. 4.

To do that, the control unit 22 transmits to the management unit 20 information about the maximum torque CMAX not to be exceeded, this maximum torque CMAX taking account both of the maximum torque CMAXt that the driveline can withstand, and also the possibility of exceeding this threshold value under specific conditions. This set point CMAX is compared in step E with the torque demand Cc expressed by the driver, the management unit 10 adopting only the smaller of these two values.

Returning to step C, it can be seen that in the case that a gearshift was decided upon in step B, a further test is then performed in step F which checks whether the gearshift decided upon is a downshift. If it is, the transmission 16 control unit 22 then proceeds, in step G, to devise a torque set point Ccons which is devised according to the engine speed-control strategy F2 described with reference to FIG. 3.

When, in step F, it is determined that the gearshift is not a downshift, it is therefore an upshift. In the envisioned case in which the transmission is a conventional automatic transmission, the transmission 16 control unit 22 will then, in step H, proceed to detect the biting of the higher gear ratio according to the method F3 described with reference to FIG. 2. Once this detection has been accomplished, the control unit 22, in step 1, implements strategy F4 of controlling the engine by torque, so as to obtain a given time for synchronization between the input shaft 14 of the transmission and the output shaft 17, as described above, still with reference to FIG. 2.

In any case, the torque set points Ccons which were devised respectively in step E, in steady state, in the absence of a gearshift and in one of steps H, I or G, in the event of a gearshift, can be delivered to the engine.

In effect, as can be seen in stage J, a logic switch receives at input, on the one hand, the information Ccons determined by the control unit during the gearshift and, on the other hand, the information determined at step e, namely the smaller of the values Cc and CMAX.

The logic switch is controlled by the existence or nonexistence of a gearshift state, and determines which of these two signals is actually delivered to the engine. Thus, it is envisioned that in the event of a gearshift being in progress, the torque information transmitted to the engine is always the set point Ccons determined by the control unit 22.

In any case, provision will advantageously be made for all other possible corrective actions transmitted to the management unit to be inhibited when the transmission 16 control unit 22 sends a management command to this engine 10 management unit. We are thinking here, in particular, of the traction control devices which affect the torque delivered by the engine, or anti-knock devices, etc.

What is claimed is:

1. A motor vehicle comprising:
   a fully automatic transmission having a transmission control unit; and
   an engine having an engine management unit, said engine management unit receives, from a throttle pedal, information representative of torque demand from a driver of the motor vehicle, on the basis of the information, the engine management unit controls operation of the engine,
   said engine management unit supplies information to the transmission control unit, management of said engine being modifiable as a function of information transmitted by the transmission control unit to the engine management unit,
   for certain phases of operation of the vehicle, the transmission control unit inhibits an action of the torque demand information and substitutes said torque demand information with an engine management command to which the engine management unit is subordinated, wherein when shifting from an old gear ratio to a new gear ratio which is progressively lower, the transmission control unit transmits to the engine management unit, a management command so that the engine follows a given speed variation curve.

2. The motor vehicle as claimed in claim 1, wherein transmission ratios are determined by whether friction couplings are disengaged or engaged, wherein the transmission is connected to the engine by a hydraulic torque converter, and wherein when shifting from an old gear ratio to a new gear ratio which is progressively lower, the transmission control unit transmits to the engine management unit a management command whereby the engine is managed such that an input shaft of the transmission follows a given speed variation curve.

3. The motor vehicle as claimed in claim 1, wherein transmission ratios are determined by whether friction couplings are disengaged or engaged, wherein the transmission is connected to the engine by a hydraulic torque converter, and wherein when shifting from an old gear ratio to a new gear ratio which is progressively higher, the transmission control unit transmits to the engine management unit, during a step that detects that the new ratio has begun to transmit useful torque, a management command whereby the engine is managed so that the engine provides a detected useful torque.

4. The motor vehicle as claimed in claim 3, wherein transmission of useful torque is detected when the onset of the drop in the rotational speed of an input shaft of the transmission is measured.

5. The motor vehicle as claimed in claim 3, wherein the detected useful torque is a constant torque.

6. The motor vehicle as claimed in claim 3, wherein a value of the engine torque as the engine decreases speed changes during an engine speed decrease step as a function of the torque demanded by the driver.

7. The motor vehicle as claimed in claim 1, wherein when shifting from an old gear ratio to a new gear ratio which is progressively higher, the transmission control unit transmits to the engine management unit, during an engine speed decrease step, a management command whereby the engine is managed so that the engine supplies an engine torque as the engine decreases speed.

8. The motor vehicle as claimed in claim 7, wherein the engine torque as the engine decreases speed is determined by the control unit so that a duration of the engine speed decrease step is substantially equal to a predetermined duration.

9. The motor vehicle as claimed in claim 3, wherein an engine speed decrease step begins when transmission of useful torque of the new ratio is detected.

10. The motor vehicle as claimed in claim 7, wherein the value of the engine torque as the engine speed decreases is a value that is constant during the engine speed decrease step.

11. The motor vehicle as claimed in claim 7, wherein the value of the engine torque as the engine speed decreases is a value which depends on the level of torque demanded by the driver.

12. The motor vehicle as claimed in claim 1, wherein the transmission control unit receives the torque demand information supplied by the throttle pedal, the torque demand information is compared by the control unit with a maximum torque value, and that when the torque demand remains higher than the maximum torque value for a predetermined duration, the transmission control unit transmits to the engine management unit, a management command whereby the engine is managed so that the engine supplies a torque equal to the maximum torque value.

13. The motor vehicle as claimed in claim 1, wherein the transmission control unit receives the torque demand information supplied by the throttle pedal, the torque demand information is compared by the control unit with a maximum torque value, and when the torque demand becomes higher than the maximum torque value, the transmission control unit transmits to the engine management unit, a management command whereby the engine is managed so that the engine supplies a torque equal to the maximum torque value, except in the event of a rapid increase in demand for torque.

14. The motor vehicle as claimed in claim 12, wherein, in the event of a rapid increase in a demand for torque, during which the torque demand becomes higher than the maximum torque value, the transmission control unit transmits to the engine management unit a management command whereby the engine is managed so as to provide a torque which is higher than the maximum torque value, and in that if, after a predetermined duration, the torque demand remains higher than the maximum torque value, the transmission control unit transmits to the engine management unit a new management command whereby the engine is managed so that the engine supplies a torque equal to the maximum torque value.

15. The motor vehicle as claimed in claim 12, wherein the maximum torque value corresponds to a maximum permissible torque that can be transmitted through part of a driveline of the vehicle.

16. The motor vehicle as claimed in claim 1, wherein the transmission is connected to the engine by a hydraulic torque lockup converter, and that when the converter locks up, the transmission control unit sends to the engine management unit a management command whereby the engine cannot deliver a torque higher than a maximum lockup torque.

17. The motor vehicle as claimed in claim 1, wherein ratios of the transmission are determined by whether friction couplings are disengaged or engaged, and in that when a ratio is engaged, the transmission control unit sends to the engine management unit a management command whereby the engine cannot deliver a torque that is higher than a maximum engagement torque.

18. A motor vehicle comprising:

a fully automatic transmission;

a transmission control unit for controlling said transmission;

an engine connected to said transmission;

an engine management unit for managing said engine; and a throttle pedal transmitting torque demand information from a user of the vehicle to the engine management unit, wherein the transmission control unit controls the transmission to follow a given speed variation curve and compares the torque demand information to a maximum torque value, so that there is at least two of a limit on engine torque as a function of design specifications of the transmission, the limit is removed when the user demonstrates a rapid increase in the demand for additional torque, and a duration for the additional torque is limited.

* * * * *